Figure 1A:
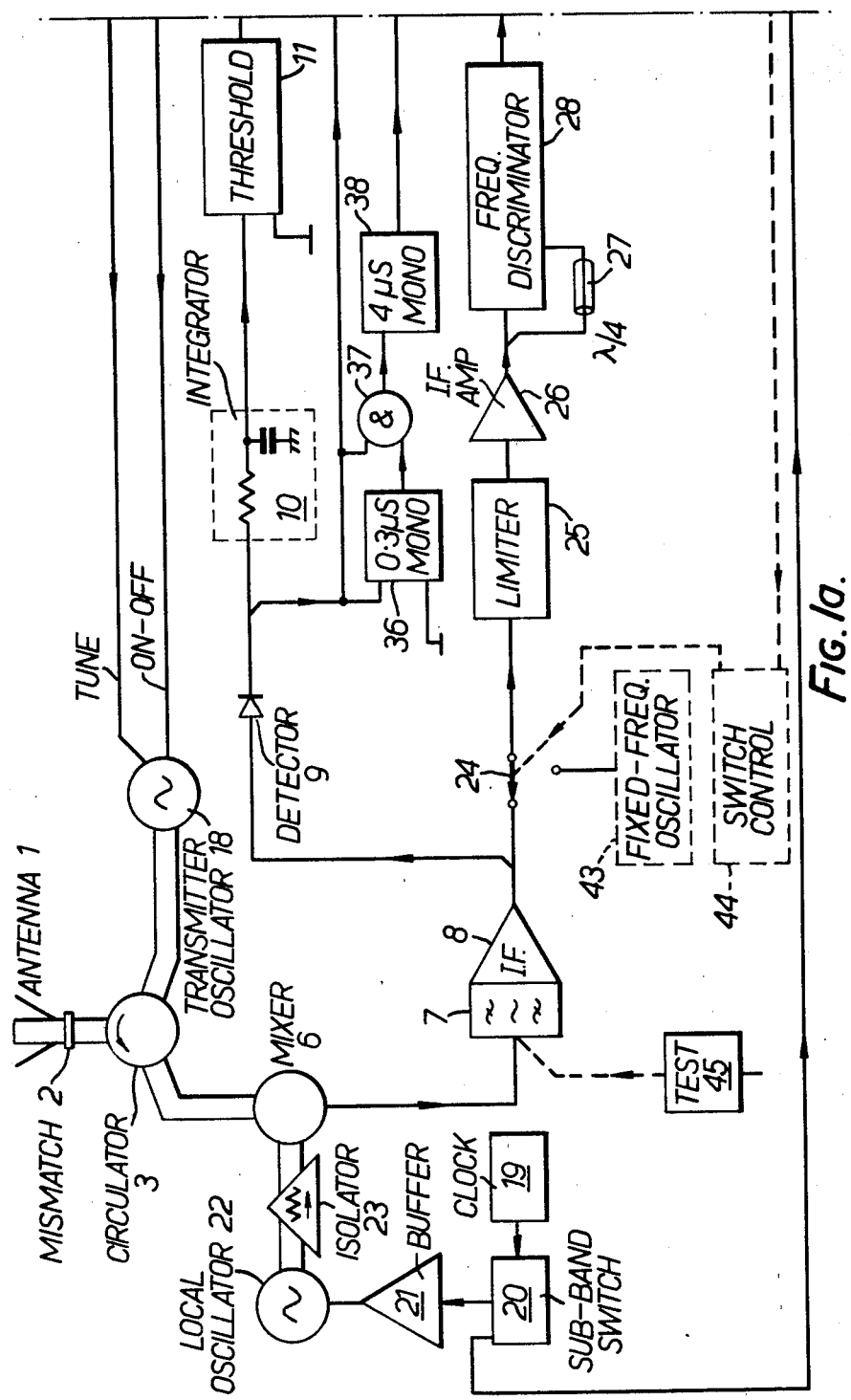

United States Patent [19]

Briggs

[11] 4,412,219

[45] Oct. 25, 1983

[54] SECONDARY RADAR RESPONDERS

[75] Inventor: John N. Briggs, Kirby Muxloe, England

[73] Assignee: The Marconi Company Limited, Chelmsford, England

[21] Appl. No.: 221,732

[22] Filed: Dec. 31, 1980

[30] Foreign Application Priority Data

Jan. 19, 1980 [GB] United Kingdom ............. 8001833

[51] Int. Cl.³ ................................... G01S 13/80
[52] U.S. Cl. ........................................... 343/6.8 R
[58] Field of Search ................... 343/6.8 R, 6.8 LC

[56] References Cited

U.S. PATENT DOCUMENTS

| | | | |
|---|---|---|---|
| 3,183,441 | 5/1965 | Francis et al. | 343/6.8 R X |
| 3,241,137 | 3/1966 | Smoll | 343/6.8 R |
| 3,524,201 | 8/1970 | Land, Jr. | 343/6.8 R |
| 3,566,234 | 2/1971 | Thomson | 343/6.8 R X |
| 3,636,453 | 1/1972 | George | 343/6.8 R X |
| 4,005,418 | 1/1977 | Gorwara | 343/6.8 R |
| 4,017,856 | 4/1977 | Wiegand | 343/18 E |
| 4,047,171 | 9/1977 | Fugit | 343/6.8 R |

FOREIGN PATENT DOCUMENTS 1019943  2/1966  United Kingdom .
1553507  9/1979  United Kingdom .

Primary Examiner—T. H. Tubbesing
Attorney, Agent, or Firm—Spencer, Kaye & Frank

[57] ABSTRACT

The invention relates to secondary radar responders which provide a reply in response to a radar signal received from a primary radar transmitter. The frequency of the received radar signal is monitored by the responder and the frequency of the response is brought into agreement therewith so that the response can be received by the primary radar transmitter at its transmission frequency. The invention is particularly applicable to marine radar systems and the responder may form part of a racon or transponder.

18 Claims, 4 Drawing Figures

SECONDARY RADAR RESPONDERS

This invention relates to secondary radar responders which provide a reply in response to a radar signal received from a primary radar transmitter. Generally the reply serves to indicate the identity of the responder and to enhance the echo strength, but in principle additional or alternative information can be given. The invention is particularly applicable to marine radar systems, which are used in conjunction with ship borne primary radars. Radar signals transmitted by a primary radar are used to interrogate a responder, which sends a reply back to the primary radar equipment if it is able to respond to the interrogation radar signals. The interrogation radar signals trigger the operation of the responder and when the reply is received at the primary radar, the range of the responder can be deduced from the delay occurring between the transmission of the interrogation radar signal and the receipt of the response. Because of this the interrogation signal is in pulsed form, so that the response can be received in the intervals between the pulses. The pulse repetition frequency and duration of the interrogation pulses are therefore selected in accordance with the required range of the radar system. In practice, the apparatus range when measured in this way is slightly greater than the true range since the responder takes a finite time to react to the interrogation radar signal and transmit its response, but this delay is known and can be allowed for. In addition, a conventional radar echo is likely to be returned from the structure of the responder, thereby allowing the true range to be directly determined. The direction of the responder corresponds to the angular orientation of the radar boresight when the interrogation radar signals are transmitted, the boresight being arranged to rotate continually in azimuth about the location of the primary radar.

Generally the primary radar equipment is designed to receive echoes at the same frequency as that at which it transmits the radar signals. A secondary radar responder is required to operate in conjunction with possibly a large number of individual primary radars operating often at mutually different frequencies, and known responders either reply at a fixed frequency to all interrogations regardless of the interrogation frequency (in which case the primary radar may require an auxiliary receiver tuned to the response frequency) or at a variable frequency swept through a frequency band in which latter case only a small proportion of the response signals are likely to be received by any given primary radar.

Radar responders are increasingly being used as beacons for marine purposes. They may be used as a navigational aid, such as for marking marine navigational stations, e.g. a lighthouse, in which case the responder is termed a racon. Alternatively, they may be used aboard ships to indicate their location, in which case they are generally termed transponders. A radar responder is arranged to provide a response signal to an interrogation pulse transmitted by a conventional primary radar. It is not necessary to generate a swept frequency interrogation signal, but instead the racon responds to the conventional radar pulses which are transmitted in the form of a directional beam by the primary radar. The response which is transmitted by the responder is received by the primary radar so that the position of the responder can be marked on the visual radar display of the primary radar.

The present invention seeks to provide an improved secondary radar responder.

According to this invention, a secondary radar responder is composed of means for receiving an interrogation pulsed radar signal, a transmitter for transmitting a pulsed response thereto in response to a received single pulse of said interrogation signal, means for monitoring the difference in frequency between said received signal and said transmitted response, and means for modifying the frequency of the transmitted response during transmission so as to reduce the difference.

Figure 1B:
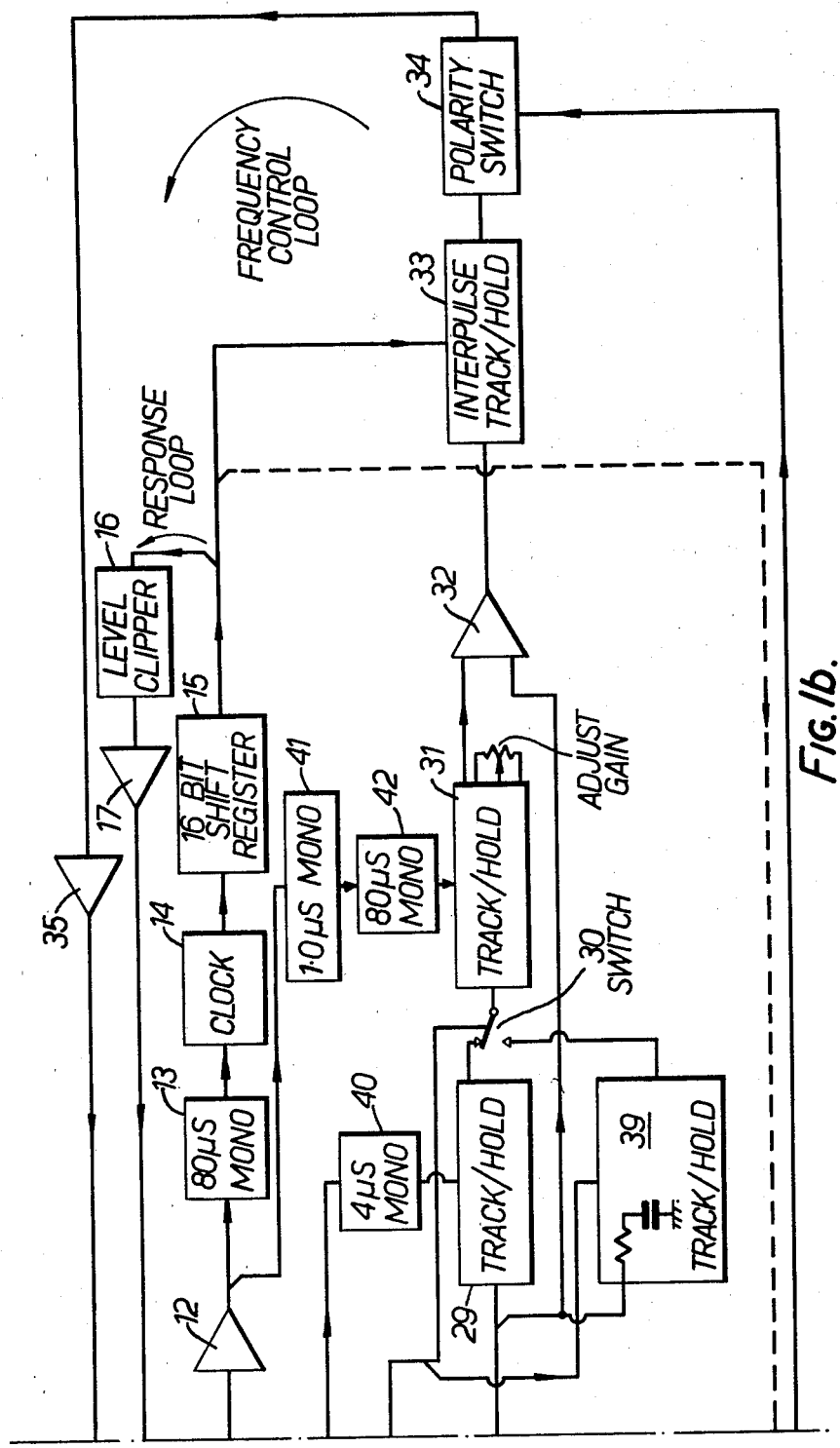
Figure 2:
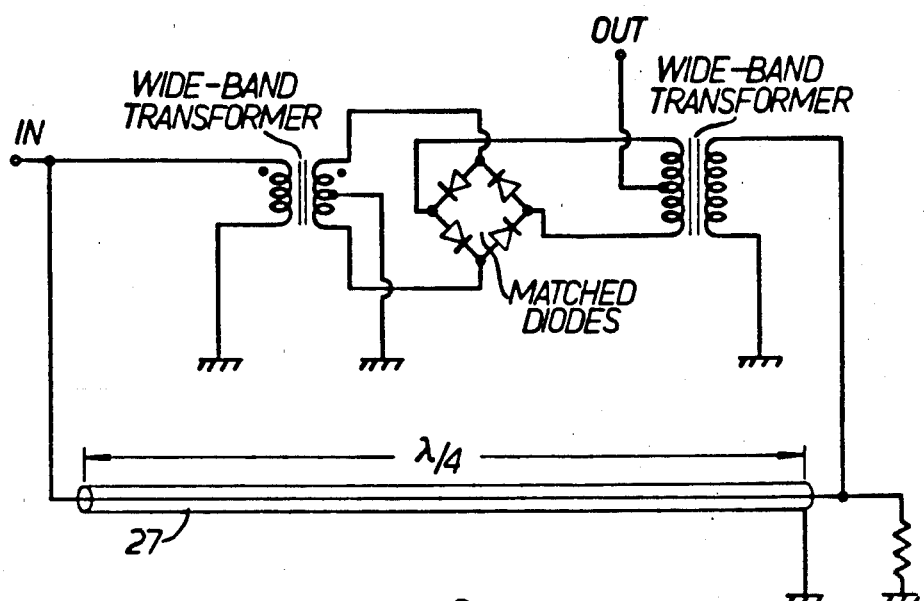
Figure 2A:
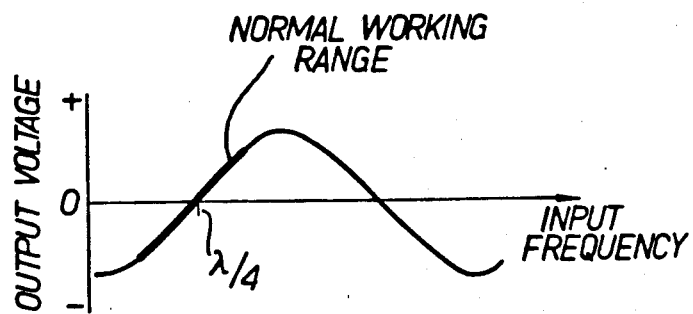
Figure 3:
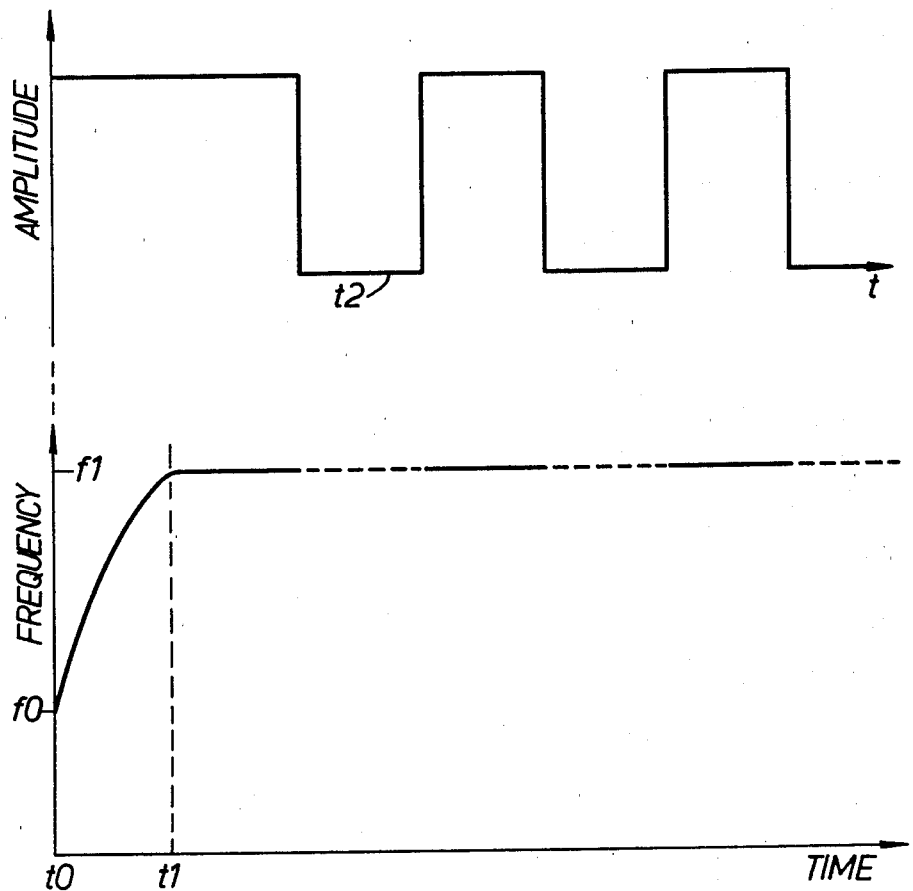

The invention is further described by way of example with reference to the accompanying drawings in which, FIGS. 1a and 1b illustrate a responder in accordance with the present invention, FIG. 2 shows one component of the circuit of FIG. 1 in greater detail, FIG. 2a is a diagram showing the operating characteristic of the circuit of FIG. 2, and FIG. 3 is an explanatory diagram.

The present invention provides a responder which transmits a response signal having a frequency which is approximately the same as the received interrogation frequency. An example of one responder in accordance with the present invention is shown in FIGS. 1a and 1b. Incoming interrogation signals are received at an omni-directional antenna 1 and are routed via a mis-match 2 in a waveguide feed to a circulator 3. The circulator 3 directs received signals to a mixer 6, which also receives a signal from a local oscillator 22 via a directional isolator 23. In the present example it is assumed that the frequency provided by the oscillator 22 is constant and is either 9270 MHz or 9550 MHz approximately. An I.F. difference frequency is provided by the mixer 6 in the conventional manner, and this is amplified by a wide band amplifier 8, which contains a bandpass filter 7 extending from 50 MHz to 230 MHz. The output of the amplifier 8 is fed to an amplitude limiter 25 which forms part of a frequency control loop, and also to a detector 9 which forms part of a response loop.

The detector 9 extracts a videosignal from the received interrogation signal. The frequency of the received interrogation signal lies in the frequency band of 180 Mhz, which extends from 9320 MHz to 9550 MHz. The interrogation signal in fact constitutes the normal pulsed transmission of a primary radar. Typically, a marine radar works at 1000 to 3400 pulses per second, each pulse having a width of from 0.05 $\mu$S to 2 $\mu$S. The pulse width is a function of the working range scale which is selected by a radar operator, and increases as longer ranges are selected. In this case the video signal derived by the detector 9 comprises the rectified envelope of the pulsed waveform. This signal is passed through an integrator 10, which comprises a resistor/capacitor network having a time constant of 0.4 $\mu$S, to a threshold circuit 11. The function of the integrator 10 is to attenuate the amplitude of short pulse signals, so that background noise and feeble short pulses from distant radars do not needlessly trigger the responder. The threshold circuit 11 is provided with an input having a predetermined threshold value, so that only signals having an energy which exceed this threshold level are passed on to the following video amplifier 12. In this way noise signals are rejected and the output of the video amplifier 12 exhibits a low false alarm rate. This means that when an output is provided by the video amplifier 12, it is almost certainly in reponse to a genuine interrogation signal, which may be a strong short pulse or a more feeble long pulse.

Interrogation signals strong enough to cross the threshold of the threshold circuit 11 (typically set so as to correspond to −78 dBW at the antenna 1) trigger a response code generator, which comprises an 80 $\mu$S monostable 13, a clock 14 and a shift register 15. The response code generator is such as to produce an appropriate sequence of pulses which uniquely identifies the responder. When the monostable 13 is initially triggered, the clock 14 is enabled and this runs at a pre-set rate (typically 1 MHz) and drives the shift register 15. Typically, the shift register 15 contains sixteen discrete bits and according to whether the individual bits of the registers are set to a logic 0 level or a logic 1 level, a train of corresponding digital binary pulses are provided at the output of the register 15. For example, if stages 1, 2, 3, 5, 7 and 9 of the register 15 are set to provide a logic 1 level and all of the remaining stages are set to produce a logic 0 level, the morse level B, which comprises the pulse sequence long-short-short-short is obtained serially at the output of the shift register 15. This pulse train is passed through a voltage clipper 16 to give a fixed definite height to the pulses and these pulses are amplified in a power amplifier 17. The amplifier 17 controls a variable frequency Gunn transmitter oscillator 18, such as to key the oscillator on and off in accordance with the pulse train applied to it. The frequency of oscillation of the transmitter oscillator 18 is determined by the level of a control signal applied to it from an amplifier 35, which forms part of the frequency control loop. The way in which the frequency of the oscillator is determined is described subsequently.

As previously mentioned, the intermediate frequency signal from the amplifier 8 is applied to a limiter 25. The limiter 25 is followed by a further I.F. amplifier 26 and the output amplitude of this amplifier is independent of interrogation frequency or amplitude provided that the received interrogation signal is within the band 9320 MHz to 9500 MHz and is sufficiently strong to trigger the responder, i.e. strong enough to exceed the threshold set by the threshold circuit 11. The amplifier 26 drives a frequency discriminator 28, which operates in conjunction with a quarter wavelength line 27. The line 27 introduces a quarter wavelength delay at the I.F. center frequency (140 Mhz in this example) and at this frequency the frequency discriminator gives zero output. The frequency discriminator is shown in greater detail in FIG. 2 and it can be seen from FIG. 2 that within the normal working frequency range, the amplitude and polarity of the output signal are indicative of the applied intermediate frequency.

The frequency discriminator shown in FIG. 2 is of a conventional type and includes a bridge arrangement of four matched diodes which operate as a balanced mixer. One set of diagonal points of this mixer is connected across the secondary of a wide-band input transformer whose primary is connected between the output of amplifier 26 and ground. The secondary of this transformer is provided with a center tap which is also grounded. The other pair of diagonals of the balanced mixer is connected across the secondary of a wide-band output transformer having a center tap at which the output signal of the discriminator appears. The quarter wavelength line 27 is connected between the output of amplifier 26 and one side of the primary of the output transformer, and is also connected to ground via a resistor. The other side of the output transformer primary is connected to ground. The frequency discriminator produces a zero voltage output when the wavelength of the input signal thereto is four times the length of the delay line 27. At lower frequencies, the inputs to the diode bridge are in phase and a negative output signal is generated in that two of the diodes conduct on positive half cycles and the other two diodes conduct on negative half cycles. In the case of higher frequency input signals, the phase of the signal at the second transformer is reversed, and a positive output signal is produced.

The output of the frequency discriminator 28 is fed to a track and hold circuit 29. The track and hold circuit 29 is such as to continuously follow the variations in the d.c. level of the signal provided by the frequency discriminator 28 and to store the value present at the instant when a strobe signal is applied to it. The strobe signal is obtained from the detector 9 via a 4 $\mu$S monostable 40. The monostable 40 provides a strobe signal having a width of approximately 4 $\mu$S which serves to store the output of the frequency discriminator 28, which is representative of the interrogation frequency, for the period of 4 $\mu$S. The input to the monostable 40 is not taken from the output of the amplifier 12, even though a low false alarm rate signal is present at that point, because the inherent time delay produced by the integrator 10 would give timing errors. The track and hold circuit 29 is followed by a further track and hold circuit 31, which is strobed via two cascaded monostables 41 and 42. The monostable 41 provides a very short delay of about 1 $\mu$S and its presence is merely to allow the operation of the first track and hold circuit 29 to settle. The monostable 42 provides a long strobe pulse having a duration of about $\lambda\mu$S. This enables the frequency discriminator output signal to be held by the track and hold circuit 31 for a relatively long period. It should be noted the amplifier 12 provides an output to trigger the monostables 41 and 42 only if the interrogation signal is sufficiently strong to exceed the threshold set by the threshold circuit 11. The use of the two track and hold circuits 29 and 31 enables a long hold time of about 80 $\mu$S to be provided in combination with a very fast response time, which is typically about 0.05 $\mu$S. Additionally, this enables the frequency information to be extracted from short interrogation pulses received at the antenna 1, before it is possible to determine whether their strength or duration is sufficient to constitute a valid interrogation signal.

The signal held in the track and hold circuit 31 is used to tune the frequency of the transmitter oscillator 18. At the instant the oscillator is fired by the pulsed output of amplifier 17 its frequency may be anywhere in the allowable frequency band, which in this example, extends from 9320 MHz to 9500 MHz. When the transmitter oscillator provides a pulsed output when the response code is applied to it from the amplifier 17, the response is transmitted by the antenna 1, but at this stage its frequency is incorrect. A sample (which is of a larger amplitude than likely interrogations) of the output power is fed to the mixer 6 by reflection from the mismatch 2 in the antenna feed. This sample is amplified by the amplifiers 8 and 26 and processed by the frequency discriminator 28, whose output is now a measure of the transmitted response frequency. The sample is also detected by the detector 9 but it does not interfere with the operation of the code generator, since the monostable 13, which has a long response time of 80 $\mu$S has already been triggered.

Since the sample is of a larger amplitude than likely interrogations the amplifier 8 is arranged to limit thereby eliminating any interrogation signals which may be present. The output of the frequency discriminator 28 is fed directly to one input of a differential amplifier 32, the other input of which is received from the track and hold circuit 31. The amplifier 32 therefore provides an output which represents, in voltage form, the difference between the interrogation and response frequencies. This value is held in a further track and hold circuit 33, the output of which is strobed by the presence of output pulses at the shift register 15. The signal held in the track and hold circuit 33 is applied via a polarity switch 34 and the amplifier 35 to tune the frequency of the oscillator 18 in such a sense as to reduce the difference in frequency between the response frequency and the interrogation frequency. The track and hold circuit 33 is strobed from the output of the shift register 15 for two reasons. If the coded response which is produced by the shift register 15 and transmitted by the oscillator 18 contains more than a single pulse, and usually it will contain several pulses, the frequency of oscillation is prevented from reverting to one or the other of its frequency extremes between pulses. During the intervals between pulses there is only one input to the error amplifier 32-this is the input from the track and hold circuit 31, and hence the amplifier 32 provides a very large output. Thus the aplifier output is allowed to modify the signal held by the track and hold circuit 33 only whilst the transmitter is providing a pulse output. Additionally, it is statistically fairly probable that a given interrogation signal will be followed by a second interrogation signal from the same primary radar rather than one from another radar. In this case the second interrogation will be replied to initially at a frequency near to the correct frequency, as this has been remembered and retained by the third track and hold circuit 13.

FIG. 3 shows one example of a response sequence in relation to the rate at which the oscillator 18 is brought to its correct frequency. In FIG. 3, the lower diagram represents the transmission frequency of the oscillator 18 and the upper diagram represents the pulsed output of the oscillator 18 as determined by the contents of the shift register 15. When an interrogation pulse is first received, it is assumed that at time t0 the oscillator 18 is set to oscillate at frequency f0, but the frequency of the received interrogation is f1 and it is at this latter frequency that the response should be transmitted. The frequency control loop operates rapidly once the oscillator 18 is triggered to bring the frequency of oscillation towards its correct value and as can be seen, the correct value is reached during the transmission of the first pulse. Preferably the first pulse is a long one, thereby providing ample time for the correct frequency to be achieved. During the intervals t2 between pulses, the strobe signal applied to the track and hold circuit 33 from the shift register 15 ensures that the frequency of oscillation is not changed. At the end of the pulse sequence, the previously transmitted frequency is remembered until it is up-dated by the next interrogation pulse.

This secondary radar responder has the following important features. The frequency of the local oscillator 22 is itself unimportant providing that it does not shift in frequency in the very short time between interrogation and response. Since each interrogation is handled individually by the frequency control loop, the responder can handle a large number of primary radars concurrently. Frequency measurement and tracking accuracy can be made such that the response frequency lies within a typical radar receiver bandwidth of 5 MHz. It should be noted that any frequency drift occurring in the oscillator 18 during the response pulse sequence is automatically corrected by the frequency control loop. When using relatively high power transmitters this is very important. Additionally, any temperature co-efficient of frequency of the response of oscillator 18 is also automatically corrected.

In marine applications a primary radar scans in azimuth, whilst transmitting high energy pulses. The rate at which the pulses are transmitted in relation to the radar beamwidth is such that typically a target may receive ten to twenty strikes for each scan in azimuth of the radar. The system as so far described above responds to each strike in each scan, but this is often not desirable as targets in the area of the response "paint" on the visual display of the primary radar would be masked by the response provided by the responder. It is preferable to arrange for the responder to reply to a given radar for say six seconds and to be quiet for say twelve seconds. There are a number of ways in which this latter requirement can be met. For example, the whole responder can be switched off by a timing device in the power supply circuit for those periods when the responder is to be quiet. Alternatively, during the quiet period, the responder can be arranged to transmit continuously, or in response to an interrogation, at a predetermined fixed frequency. In this event, the responder can also be used as a fixed frequency racon apart from the relatively short intervals when its output frequency is arranged to match the interrogation frequency. When the responder is working in a fixed frequency mode, a crystal controlled oscillator 43 (shown in broken line in FIG. 1a) injects the frequency into the frequency discriminator 28 via an appropriately set switch 24, the limiter 25 and the I.F. amplifier 26. The frequency control loop of the responder then ensures that the correct frequency is transmitted, but the oscillator 43 is gated off by a switch control 44 while the transmitter oscillator 18 is actually transmitting.

The bandwidth of the I.F. stages previously described is very wide, typically 180 MHz in the example given previously. It is desirable to reduce the I.F. bandwidth to say one third of this and this could be achieved by making the local oscillator 22 tunable so that it can be switched between three different frequencies. Thus in a total cycle of eighteen seconds, the oscillator 22 would spend six seconds at each frequency. The oscillator would be switched by an appropriate clock 19 which operates a sub-band frequency switch 20, which in turn tunes the oscillator 22 via an appropriate buffer amplifier 21. In order to keep image frequencies out of the frequency band of 9320 MHz to 9500 MHz, it may be convenient to have one or possibly two of the local oscillator frequencies below 9320 MHz with the remaining two or one respectively near or above 9500 MHz. It should be noted that this will necessitate the switching of the sense of the error amplifier output by means of the polarity switch 34 in order to apply the correct polarity to the amplifier 35 to produce negative feedback around the frequency control loop.

As described so far, the responder samples the frequency of interrogation as soon as an interrogation signal is detected. In practice, a negligible delay of about 40 nS may be present, which is determined by circuit design. However, if the interrogation pulse is relatively long, say up to 1 μS, the radar transmitter which transmits the interrogation pulse may not have had time to settle to its final frequency within 40 nS of the commencement of the pulse transmission. Consequently the frequency of the interrogation pulse may initially differ from that frequency of the body of the pulse to which the radar receiver is tuned and this would result in the responder replying at an incorrect frequency. Under this circumstance, the response signal might not be received at the radar, particularly as the radar receiver bandwidth is likely to be low if a longer interrogation pulse is transmitted. The circuit arrangement shown in FIG. 1 includes provision for overcoming this difficulty.

The leading edge of the video pulse output of the detector 9 is arranged to additionally trigger a monostable 36, which provides an output pulse having a duration of 0.3 μS. If, and only if, the interrogation pulse is still present at the output of the detector 9 at this time, an AND gate 37 provides an output level which triggers a 4 μS monostable device 38. The monostable 38 provides an output which operates a change-over switch 30, so that the output of the track and hold circuit 29 is not applied to the other track and hold circuit 31. An additional track and hold circuit 39 is in parallel with the track and hold circuit 29, but its operation is made sluggish by the insertion of a resistance in its input connection, so that the response rate of its holding capacitor is slowed down. The tracking time constant is made about 0.1 μS, so that the output voltage provided by the track and hold circuit 39 is the measure of the frequency occurring during the previous 0.1 μS. If the interrogation pulse is 0.3 μS duration or longer, a voltage is obtained which is representative of the average frequency after about 0.25 μS following receipt of the leading edge of the interrogation pulse and it is this voltage which is fed by switch 30 to the track and hold circuit 31. A further effect of using a slow response track and hold circuit 39 is that its effective noise bandwidth is reduced, thereby making its voltage output less noise dependent. When the track and hold circuit 39 is used, it is necessary to ensure that the oscillator 18 does not fire within 0.3 μS of the start of an interrogation pulse, and this requirement can be met by a bandwidth limitation in, for example, amplifier 17.

It will be appreciated from the description given on the operation of FIGS. 1a and 1b, that the output of the frequency discriminator 28 is driven by the frequency control loop to seek the voltage level stored by the track and hold store 31, so as to tend to equalize the two input signals present at the amplifier 32. If the loop gain is not very high, exact signal level equality of the two inputs to the amplifier 32 is not achieved and a frequency error will be present in the transmitted frequency response. For example, if the loop gain is 10, then a 100 MHz excursion of the interrogation frequency from the center frequency will cause only a 90 MHz excursion in the response frequency, thereby leaving an error of 10 MHz. However, this effect may be corrected by giving the track and hold circuit 31 a gain in excess of unity. In the example presently under consideration a gain of 1.11 is required. Then a 100 MHz interrogation frequency excursion causes a voltage at the output of the track and hold circuit 31, which is equivalent to 111 MHz. Thus in principle the frequency control loop provides a 100 MHz correction giving an overall frequency error of zero.

It may be desirable to test the operation of the responder in the absence of an interrogation pulse. This can be arranged by providing a test circuit 45 to inject internally generated narrow pulses at say 1000 pulses per second into the I.F. stage prior to the filter 7. Two frequency controlled oscillators could be provided, each tuned respectively to the intermediate frequency equivalent of the frequency band edges. When the system is to be tested, one of these oscillators is gated into circuit for say 100 nS on the first and second test pulses, whereas the other oscillator is gated on for the third and fourth test pulses, the sequence then being repeated. Inspection of the control signal provided by amplifier 35 to the oscillator 18 will indicate whether a signal level change was present between the first and second test pulses or the third and fourth test pulses. Such changes would indicate that the frequency control loop is not operating correctly.

I claim:

1. A secondary radar responder including means for receiving an interrogation pulsed radar signal, a transmitter for transmitting a pulsed response thereto in response to a received single pulse of said interrogation signal, means for monitoring the difference in frequency between said received single pulse and said transmitted response, and means for modifying the frequency of the transmitted response during transmission so as to reduce the difference, wherein said monitoring means comprise storage means for storing a signal representative of the frequency of said single pulse of said interrogation signal, and means for comparing a signal representative of the frequency of the transmitted response with the stored signal whereby the result of said comparison is used to modify the frequency of the transmitted response.

2. A responder as claimed in claim 1 wherein said modifying means comprise means for storing the value of the frequency of the immediately preceding response until the next following pulse of the interrogation signal is received, to enable the next response to be transmitted initially at the same frequency as the preceding response.

3. A responder as claimed in claim 1 wherein said monitoring means comprise means for determining whether the duration of the single pulse of the interrogation signal exceeds a predetermined period, whereby if said predetermined period is exceeded the signal which is stored in said storage means is representative of the average frequency of said single pulse present for a selected portion of its duration.

4. A responder as claimed in claim 1 and wherein said storage means is provided with a gain which is greater than unity, so as to minimize the residual difference between the frequency of the transmitted response and the frequency of the interrogation signal.

5. A responder as claimed in claim 1 wherein said modifying means comprise a frequency control circuit for generating a control signal which determines the frequency of the transmitted response in dependence on said comparison, and means for holding the value of said control signal constant unless said transmitter is actually transmitting, whereby the frequency of transmission remains constant between adjacent pulses of the same pulsed response, but is allowed to change during the transmission of a pulse.

6. A responder as claimed in claim 1 and wherein said comparing means comprise a threshold circuit connected for permitting the stored signal which is representative of the frequency of interrogation to be used for comparison only if the energy of the received interrogation signal exceeds a threshold value.

7. A responder as claimed in claim 6 and wherein the storage means comprises two elements, said stored signal being held temporarily in one of said elements until it has been determined whether the energy of the received interrogation signal exceeds the threshold value, the stored signal being transferred to the other of said elements to enable the comparison to take place only if said threshold value is exceeded.

8. A responder as claimed in claim 7 and wherein said storage means further comprises control means responsive to the presence of a signal indicative of a received interrogation signal whose energy exceeds said threshold for transferring the stored signal to the other of said elements of the storage means to initiate the comparison.

9. A responder as claimed in claim 6 wherein said receiving means comprise a code generator for determining the nature of said pulsed response, the response being transmitted in response to the reception of an interrogation signal whose energy exceeds said threshold value.

10. A responder as claimed in claim 9 and wherein the code generator comprises a store, from which binary bits are read out in a sequence which determines the nature of the pulsed response.

11. A responder as claimed in claim 10 and wherein the code generator comprises a serial shift register containing a binary sequence of stored data, and means are provided for clocking out the data of the shift register to key a transmitter oscillator on and off in accordance with the binary sequence.

12. A responder as claimed in claim 1 and wherein said modifying means comprise means for establishing substantial equality between the frequency of said received single pulse and the frequency of the transmitted pulsed response during the time of transmission of the pulsed response.

13. A secondary radar responder including means for receiving an interrogation pulsed radar signal, a transmitter for transmitting a pulsed response thereto in response to a received single pulse of said interrogation signal, means for monitoring the difference in frequency between said received single pulse and said transmitted response, and means for modifying the frequency of the transmitted response during transmission so as to reduce the difference, said responder further including a common antenna for receiving the interrogation signal and for transmitting the pulsed response, and an antenna feed having means for diverting a proportion of the energy generated by the responder transmitter to the responder receiver, so as to enable the frequency of the transmission to be compared with the frequency of the interrogation and any difference reduced.

14. A responder as claimed in claim 13 and wherein said means for diverting comprises a waveguide mismatch arranged to reflect a proportion of the transmitted energy.

15. A secondary radar responder including means for receiving an interrogation pulsed radar signal, a transmitter for transmitting a pulsed response thereto in response to a received single pulse of said interrogation signal, means for monitoring the difference in frequency between said received single pulse and said transmitted response, and means for modifying the frequency of the transmitted response during transmission so as to reduce the difference, said responder further including timing means for causing said responder to respond to an interrogation frequency of a received interrogation signal only during periodically recurring time periods.

16. A responder as claimed in claim 15 and wherein said timing means include means for maintaining said responder quiet apart from said periodically recurring time periods.

17. A responder as claimed in claim 15 and further including signal generating means for causing said responder to transmit at a predetermined frequency or frequencies except during said periodically recurring time periods.

18. A secondary radar responder including means for receiving an interrogation pulsed radar signal, a transmitter for transmitting a pulsed response thereto in response to a received single pulse of said interrogation signal, means for monitoring the difference in frequency between said received single pulse and said transmitted response, and means for modifying the frequency of the transmitted response during transmission so as to reduce the difference, said responder further including sub-band switching means connected for operating said responder in successive ones of a plurality of sub-bands which together constitute the total frequency band over which the respondes can accept interrogation signals.

* * * * *